April 16, 1935.  A. M. McGIFF ET AL  1,997,941
CONTAINER FOR AUTOMOBILES
Filed March 16, 1934
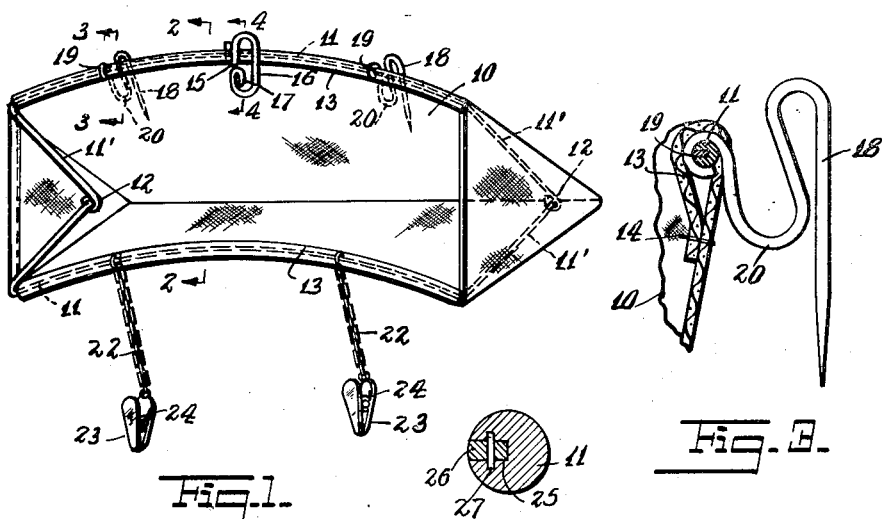
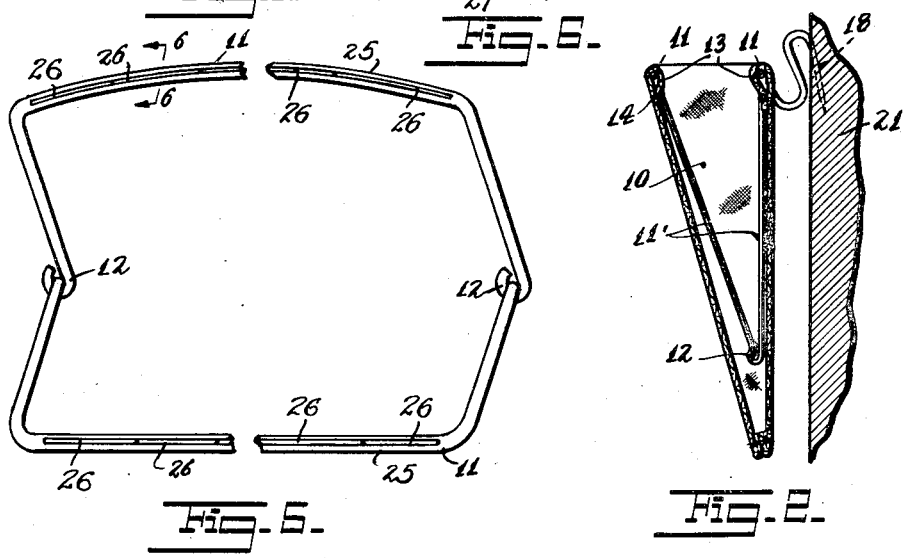
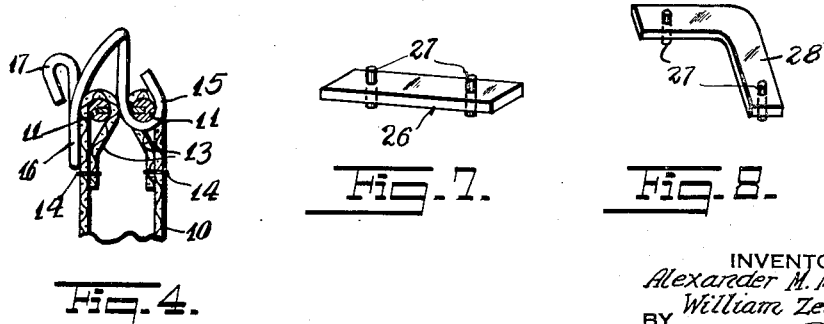
INVENTORS
Alexander M. McGiff
William Zeuner
BY
ATTORNEY Patented Apr. 16, 1935

1,997,941

UNITED STATES PATENT OFFICE 1,997,941

CONTAINER FOR AUTOMOBILES

Alexander M. McGiff and William Zeuner, New York, N. Y.

Application March 16, 1934, Serial No. 715,876

3 Claims. (Cl. 150—29)

This invention relates to new and useful improvements in a container to be attached within automobiles and other places.

The invention has for an object the construction of an article as mentioned which is adapted to be changed in form so as to be adapted to fit into corners, curved portions and other portions of an automobile or other place.

Still further the invention proposes the construction of a container which is characterized by the provision of a cloth container open at the top and a wire frame within said container arranged of sections adapted to be moved for opening and closing the container, and said wire section being constructed of bendable material so that the container may be changed in shape and adapted for corners or other portions.

Still further the invention proposes the provision of a novel arrangement associated with the wire frame by which the container may be attached upon the cloth covered walls of an automobile or other parts, provided these parts are constructed of material which may be easily pierced.

Still further the invention also proposes the provision of a novel element arranged upon the wire frame and adapted to hold the container in closed position.

As another object of this invention an arrangement is proposed associated with the wire frame of the container whereby the wire frame may be held in various shapes.

Still further the invention proposes the provision of stiffening elements removably engaged in the sides of a bendable frame for controlling the bending of the frame in a container as described.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a container constructed according to this invention.

Fig. 2 is a fragmentary enlarged sectional view taken on the line 2—2 of Fig. 1, but shown applied upon a supporting surface.

Fig. 3 is a fragmentary enlarged sectional view taken on the line 3—3 of Fig. 1.

Fig. 4 is a sectional view taken on the line 4—4 of Fig. 1, but illustrating the container in a closed position.

Fig. 5 is a perspective view of the frame per se used in the container.

Fig. 6 is an enlarged sectional view taken on the line 6—6 of Fig. 5.

Fig. 7 is a perspective view of a non-bendable element to be used in conjunction with the frame shown in Fig. 5.

Fig. 8 is a perspective view of another non-bendable element to be used in conjunction with the frame illustrated in Fig. 5 when this frame is bent so that a portion thereof is at the angle of the piece shown in Fig. 8.

The container for automobiles or other places according to this invention comprises a cloth container 10 which is open at the top and which is provided with a wire frame within the container consisting of a pair of adjacent substantially inverted U-shaped sections each having side arms 11' and a central connection portion 11. These frame sections are arranged with the adjacent arms 11' pivotally connected as shown. Each of the free ends of the arms 11' are bent into small loops 12 which interengage each other to produce a pivotal connection. The central portions 11 of each of the frame sections are attached to the front and rear top edges respectively of the said cloth container. More particularly the front and rear edges of the container have bent down portions 13 which are secured in position by lines of stitches 14 so as to produce longitudinal passages through which the central portions 11 pass. At the ends of the bent down portions 13, the side arms 11' of the frames extend and extend downwards into the bag. The arrangement is such that the cloth container may be opened as illustrated in Fig. 1 or the top front and side edges of the container may be moved together for constituting a closed position of the container.

A means is provided for holding the container in closed position. This means is arranged upon one of the central portions 11 of the frame sections and is adapted to co-act with the other of the central portions to hold the container closed. More particularly this means comprises a piece of wire having one end 15 bent around the frame section 11 and then continuing upwards and subsequently downwards into a portion 16 adapted to engage over the other of the central portions 11. In Fig. 4 the wire portion 16 is shown in engaged positions holding the container closed. A continuation 17 from the portions 16 constitutes a handle by which the wire may be conveniently moved.

A means is provided for detachably mounting the container upon soft material such as the inner walls of an automobile, which are usually cloth covered, or other similar articles. More particularly these means comprise several (a pair) hooks each comprising a piece of wire sharpened at one end 18 for engaging into the wall or similar part and continuing into portions 19 bent around the central portion 11. The portions 18 and 19 are connected by a bent portion 20 extending downwards and upwards as clearly illustrated in Fig. 3 so as to provide a certain degree of resiliency in the attachment element. In Fig. 2 reference numeral 21 indicates the wall of an automobile to illustrate the manner in which the fastening element 18, 19 and 20 is engaged in place for the purpose of supporting the container. At the point where the bent portions 15 and 19 of the holding means 15, 16 and 17, and the supporting means 18, 19 and 20, engage the central portions 11, the bent portion 13 of the top edge of the cloth container is cut away so that direct contact is made with the central portion. With this arrangement the closing means and the supporting means are pivotally mounted upon the central member, but are restrained against longitudinal motion by the cloth bent portion 13.

Associated with the container there are several chains 22 which are attached at one of their ends upon the central portion 11 of the frame sections remote from the central portion provided with the holding and supporting means. Clips 23 are attached upon the ends of the chains 22. These clips are of the type that are provided with pivoted jaws and springs 24 urging the jaws closed. The purpose of these clips are to support articles which may not be placed within the container, for example, the hats of persons. The container is of exceptional value in supporting foods or other small articles to be carried along in the automobile on excursions or at other times.

A feature of the container is that the central portions 11 are constructed of pliable wire material so as to be readily bendable into various shapes desired and to maintain these shapes. As illustrated in Fig. 1 the central portions 11 are of slightly arcuate shape for the purpose of fitting against a similarly curved wall in an automobile. If desired the central portions 11 may be bent into other shapes for example certain portions thereof, at right angles to each other so as to fit within the corner between the two walls.

Each of the central portions 11 are constructed with grooves 25 extended in from one of the sides into which stiffening elements 26 are engaged. These elements 26 are removably mounted in a manner so as to normally maintain their positions and hold the central element 11 against being bent. For example, these elements 26 may be constructed of steel or other similar hard material. Each of the elements 26 have several pegs 27 projecting from the top and bottom surface and engaging into corresponding openings in the sides of the grooves 25 to constitute the detachable mounting of the elements. The elements 26 are inserted and removed from the grooves 25 by bending the materials of the central portions to spread the opposed faces of the grooves apart and together as desired. The elements 27 are of small pieces, placed together to completely fill the grooves 25 which extend the entire lengths of the central portions. It is intended that various elements 26 of different shapes, for example an angular member 28 as illustrated in Fig. 8, or straight members 26 illustrated in Fig. 7, be provided with the container so that the owner may select various of the elements to be substituted for the elements originally contained in the central portion of the wire frames for obtaining any desired shape.

The invention may better be understood by considering the Fig. 1 and realizing that to change the shape of the container, first the stitches 14 must be removed so as to expose the central portions 11. Then the elements 26 from the central portions must be removed from the central portions by openings, the sides thereof to free the pegs 27 and next the central portions may be bent into any desirable shape. Next other elements such as 26, 28 or similar elements merely differing in shapes are reengaged in the grooves 25 to maintain the frame in the new shape. Thereafter the turned down ends 13 of the container are sewed down again.

A container constructed according to this invention is of exceptional utility in that it may be removed from the wall of an automobile whenever desired or placed thereon. When removed it may be folded into a small compass or when supported it may be closed by the aid of the closing elements 15, 16 and 17.

It is to be understood that the container may also be secured to the wall of an automobile permanently without the use of hooks 18.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Patent is:—

1. A container for automobiles or other places, comprising a cloth container open at the top, a wire frame in said container and consisting of a pair of adjacent substantially inverted U-shaped sections with adjacent arms pivotally connected and with central portions between the arms attached on the front and rear top edges of said cloth container, the front and rear top edges of said cloth container being bent over said central portion and secured down by stitches to constitute the attachment of the central portions upon the edges of the container, said central portions comprising pliable material adapting the device to be shaped as desired, said central portion being formed with grooves extended in from one side, and stiffening elements detachably mounted within said grooves to hold the central portions against being bent.

2. A container for automobiles or other places, comprising a cloth container open at the top, a wire frame in said container and consisting of a pair of adjacent substantially inverted U-shaped sections with adjacent arms pivotally connected and with central portions between the arms attached on the front and rear top edges of said cloth container, the front and rear top edges of said cloth container being bent over said central portion and secured down by stitches to constitute the attachment of the central portions upon the edges of the container, said central portions comprising pliable material adapting the device to be shaped as desired, said central portion being formed with grooves extended in from one side, and stiffening elements detachably mounted within said grooves to hold the central portions against being bent, said detachable elements being provided with pins projecting upwards and downwards and engaging the top and bottom walls respectively of said grooves.

3. A container for automobiles or other places, comprising a cloth container open at the top, a wire frame in said container and consisting of a pair of adjacent substantially inverted U-shaped sections with adjacent arms pivotally connected and with central portions between the arms attached on the front and rear top edges of said cloth container, the front and rear top edges of said cloth container being bent over said central portion and secured down by stitches to constitute the attachment of the central portions upon the edges of the container, said central portions comprising pliable material adapting the device to be shaped as desired, and stiffening elements detachably mounted on said central portions to hold the central portions against being bent.

ALEXANDER M. McGIFF.
WILLIAM ZEUNER.